Sept. 12, 1961  L. A. BIXBY ET AL  2,999,695
SUSPENSION FOR TANDEM AXLE ASSEMBLY
Filed Oct. 18, 1957  5 Sheets-Sheet 1

INVENTORS.
LEO A. BIXBY
CLARENCE C. BARTELL
BY
*Strauch, Nolan & Neale*
ATTORNEYS

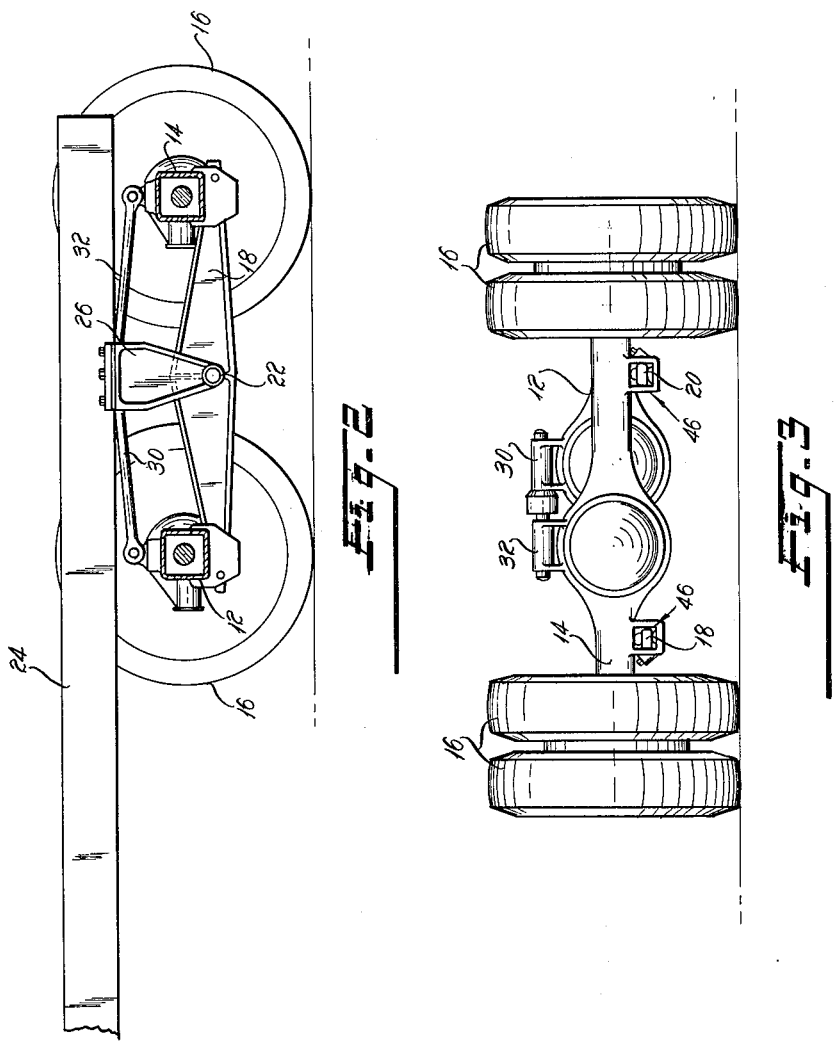

Sept. 12, 1961 L. A. BIXBY ET AL 2,999,695
SUSPENSION FOR TANDEM AXLE ASSEMBLY
Filed Oct. 18, 1957 5 Sheets-Sheet 3

INVENTORS.
LEO A. BIXBY
CLARENCE C. BARTELL
BY
*Strauch, Nolan & Neale*
ATTORNEYS

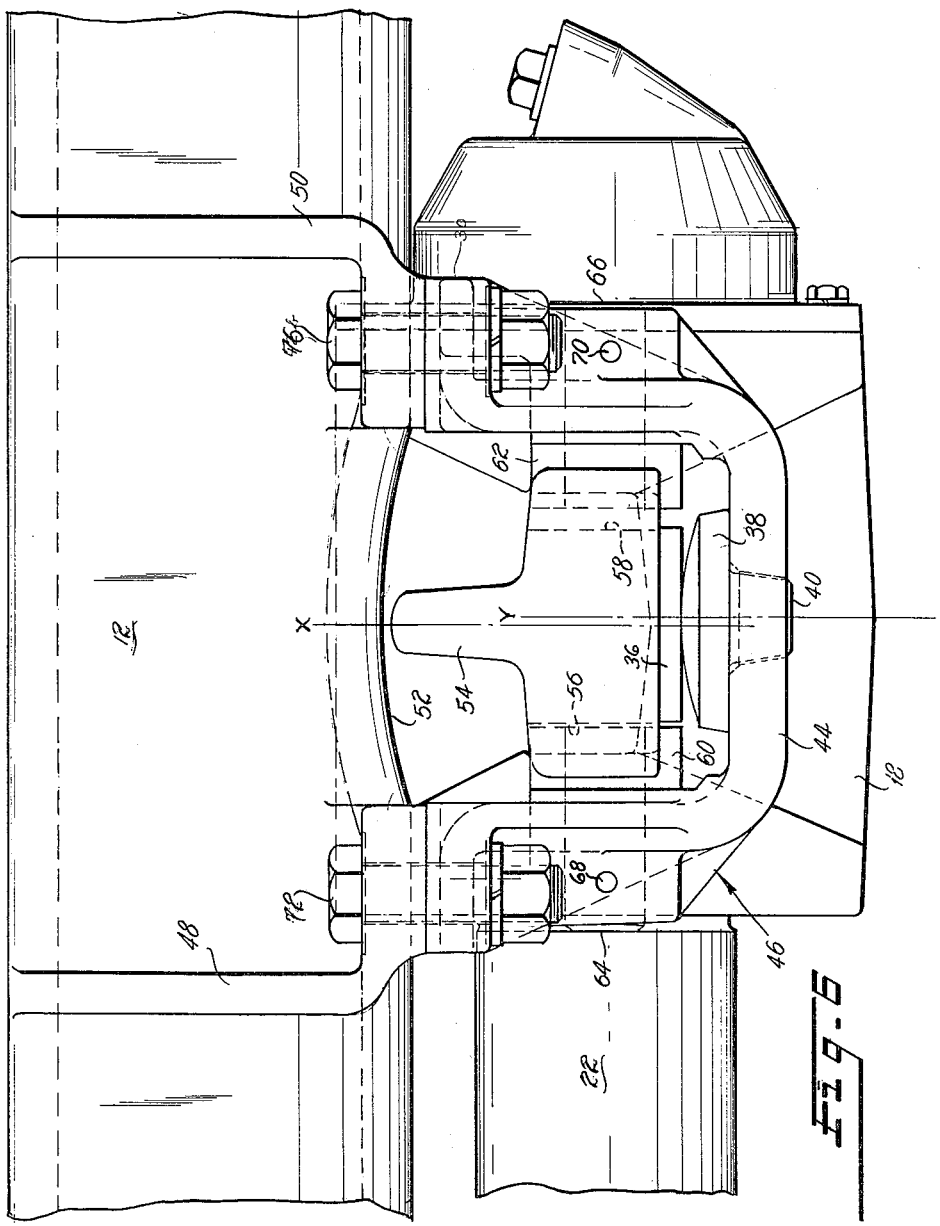

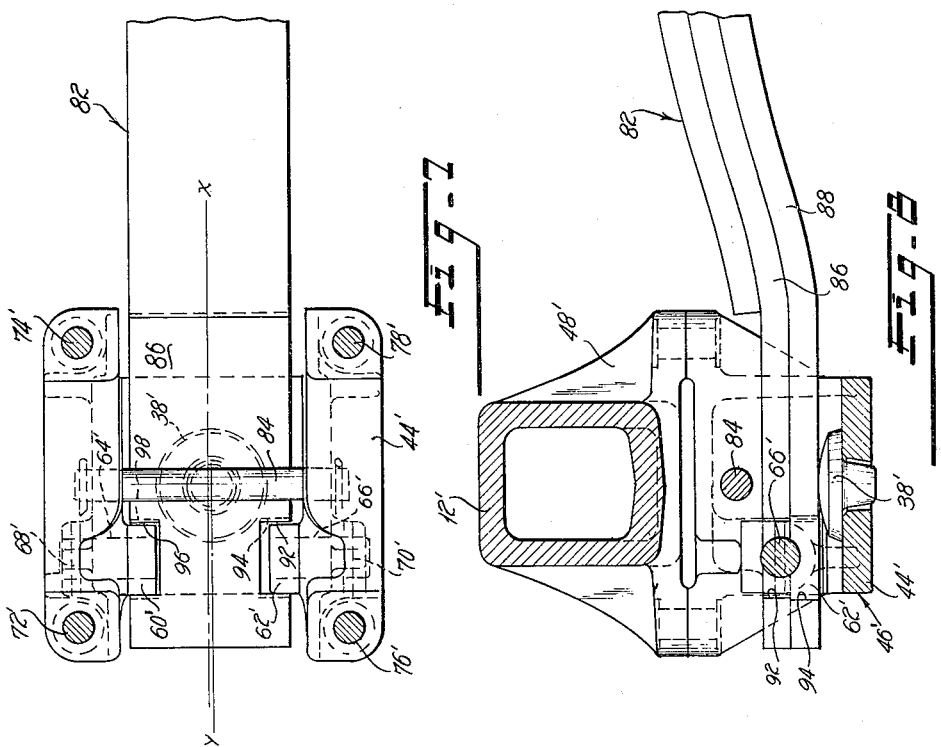
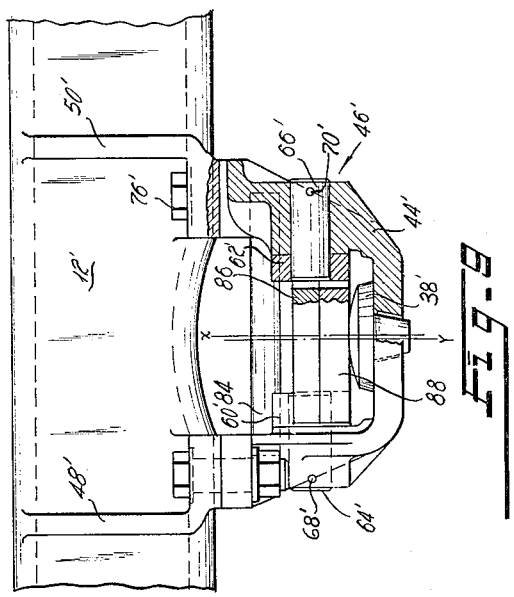

United States Patent Office 2,999,695
Patented Sept. 12, 1961

2,999,695
SUSPENSION FOR TANDEM AXLE ASSEMBLY
Leo A. Bixby, Niles, and Clarence C. Bartell, Dearborn, Mich.; said Bixby assignor to Rockwell-Standard Corporation, a corporation of Pennsylvania
Filed Oct. 18, 1957, Ser. No. 691,080
10 Claims. (Cl. 280—104.5)

The present invention relates to improvements in tandem axle units and more particularly to improvements in tandem axle suspensions.

An object of the present invention is to provide a tandem axle suspension system incorporating rocker or walking beams, either of the leaf spring or rigid type, pivotally secured at their centers on opposite sides of the tandem axle assembly, their ends being so pivotally connected to the axles that a complete equalizing effect is achieved when the vehicle is moving over uneven road surfaces.

Another object of the present invention is the provision of a tandem axle suspension system embodying a rocker or walking beam of either the rigid or leaf spring type pivotally secured at their centers on opposite sides of the tandem axle assembly, their ends being so pivotally interconnected with brackets depending from the axles as to assure the aforesaid driving effect.

A further object of the invention is to provide in a tandem axle assembly having rocker beam connected axles, an improved beam to axle substantially universal connection permitting free relative pivotal movement between the beam and axle connected thereby about axes extending longitudinally of the axle and beam and limited relative displacement in the direction of such axle axis and normal to such axes while restraining relative movement therebetween in the direction of such beam axis whereby free articulation of said axles may be effected while maintaining the proper spacial relation therebetween.

A further object of the present invention is to provide, in a rocker beam connected tandem axle assembly, hanger brackets secured to the axles adjacent the wheels serving as supports for the ends of the rocker beams which rest inside the brackets on hardened spherical surfaced blocks inserted into the brackets enabling the rocker beams to rock upon them thereby assuring a limited flexibility of the tandem axle assembly.

These and other objects of the present invention will become more fully apparent by reference to the appended claims and as the following detailed description proceeds in reference to the accompanying drawings wherein:

FIGURE 2 is a view substantially along the line 2—2 of FIGURE 1;

FIGURE 3 is a rear view of the assembly shown in FIGURE 1;

FIGURE 6 is an enlarged end view of the structure shown in FIGURE 4;

FIGURE 7 is a top view similar to FIGURE 4 of a second embodiment of the invention;

FIGURE 8 is a side view of the structure of FIGURE 7; and

FIGURE 9 is an end view of the structure shown in FIGURE 7.

The illustrative tandem axle unit embodiments as herein disclosed comprise a pair of driving axles interconnected at opposite sides of the vehicle frame by rocker or walking beams of either the rigid beam type or of the flexible leaf spring type. The beams are journalled relative to the vehicle frame at their centers upon a transverse axle or cross tube, their respective ends being pivotally secured in brackets beneath each of the spaced axles.

Since the position of each rocker beam is independent of the position of the other, the four outer end wheel assemblies adapt themselves readily to any uneven road surface condition. To restrain the axles from displacement in response to driving or braking torques applied thereto, upper torque rods have been provided to coact with the beams to restrain such movement of the axles.

The outer ends of the beams rest on spherical faced blocks set into the aforementioned brackets and are free to pivot around pivoting blocks secured to pins inserted into the brackets. A clearance is provided between the pivot blocks and the beam to compensate for lateral movement and alignment of the axles with a greater clearance on the side of the beam remote from the longitudinal center line of the assembly to provide for the articulation of diagonal wheels.

Figure 1:
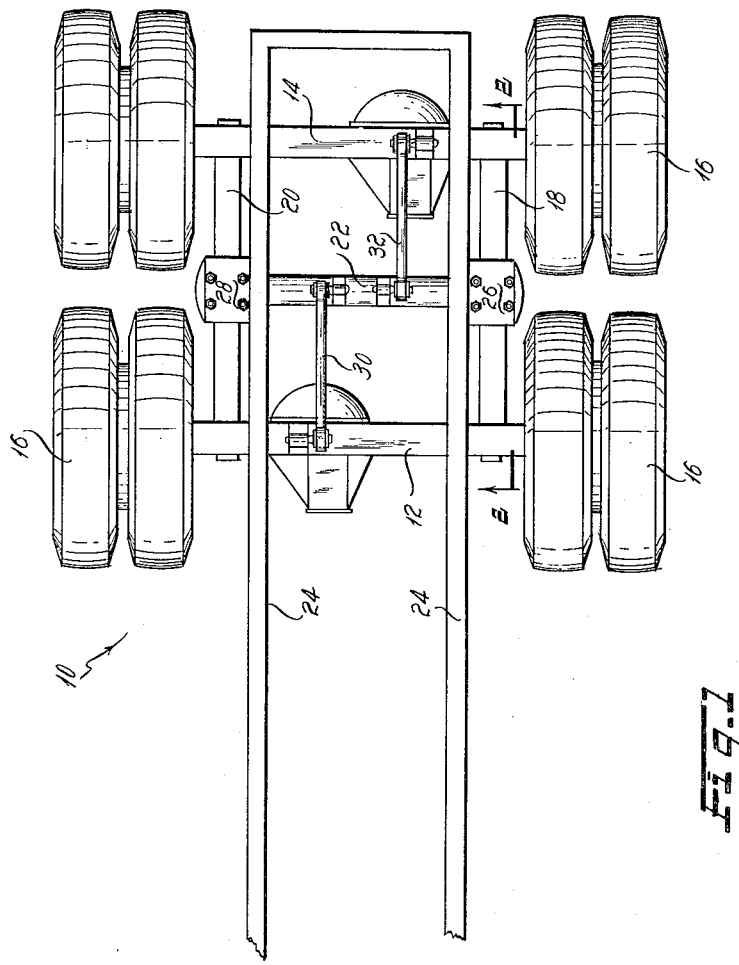
FIGURE 1 is a top plan view of a tandem axle unit embodying the present invention.

FIGURES 1 to 3 of the drawings illustrate a tandem axle assembly 10 comprising spaced parallel axles 12 and 14 supported at their outer ends by ground engaging wheels 16 and interconnected by rocker or walking beams 18 and 20 which are pivoted upon the opposite ends of a cross tube 22 fixed transversely beneath the frame 24 by depending frame mounted brackets 26 and 28. Axles 12 and 14 are normally drive axles as illustrated but either or both may be non-driving axles in the broader aspects of the present invention. Torque rods 30 and 32 are operatively interposed between the frame 24 on the vehicle body (not shown) and the axles 12 and 14 respectively to resist the turning effect on the axles of the application of braking or driving torque thereto.

Figures 4, 5:
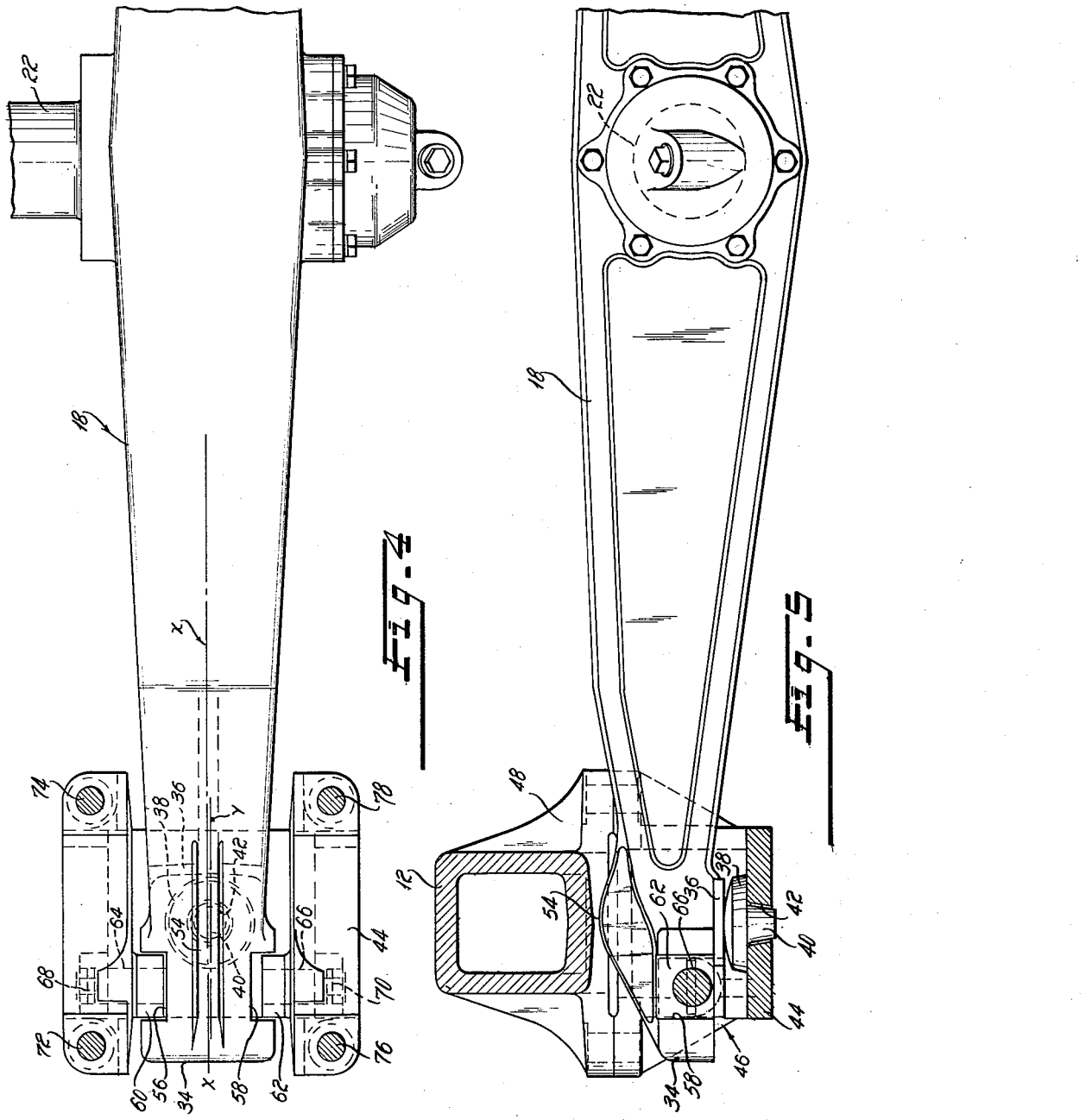
FIGURE 4 is a top view of one side of the beam to axle connecting assembly of the unit of FIGURE 1.
FIGURE 5 is a side view of the structure shown in FIGURE 4.

FIGURES 4, 5 and 6 show the beam to axle connection between one end of one of the rocker beams and one of the axles; the other three connections between the beams 18 and 20 and the axles 12 and 14 in the tandem unit 10 are similar in every respect to the one illustrated in FIGURES 4, 5 and 6.

The beam 18 is of rigid construction and terminates at its opposite ends in a flat 34 provided on its underside with a hardened welded-on block 36 having a planar bottom surface which rests on a hardened spherical faced block 38 having a downwardly extending tapered shank 40 received in a similarly tapered bore 42 through the bottom wall of the lower part 44 of a three-part hanger bracket 46. The upper parts 48 and 50 of bracket 46 (FIGURE 6) are welded to the sides of the housing of axle 12. The lower face of the housing of axle 12 is formed with a smooth concave surface 52 intermediate bracket parts 48 and 50 to provide for the rebound movement of the beam 18. Rebound movement of beam 18 is limited by the engagement of a raised portion 54 formed integrally on the top of the outer end of the beam 18 with surface 52. The top surface of portion 54 must be a smooth curved surface to assure proper coaction with surface 52.

The opposite sides of beam 18 are formed with transversely extending machined notches or grooves 56 and 58 (FIGURE 4) which slidably receive hardened pivoting blocks 60 and 62 pivotally mounted about a common axis extending longitudinally of the axle 12 on concentric pins 64 and 66 which are press-fitted into bracket part 44 and pinned in place by dowels 68 and 70. The top surface of portion 54 of beam 18 coacts with surface 52 on the housing of axle 12 to prevent disengagement of notches 56 and 58 from blocks 60 and 62 during rebound movement between the axle 12 and beam 18.

The bracket part 44 is securely connected to parts 48 and 50 by bolt and nut assemblies 72, 74, 76 and 78.

Referring to FIGURES 4 and 6, in the normal configuration of the assembly 10 corresponding to movement along a flat roadway or ground surface, the longitudinal center line X of the beam 18 is located more closely adjacent the center of assembly 10 than the center line Y of the bracket 46 and the spherical block 38 to provide a larger clearance between the end face of pivot block 62 and the end wall of notch 58 on the beam 18 than between the end face of block 60 and the end wall of notch 56 to accommodate relative movement between axle 12 and beam 18 in the direction of the pivot axis of blocks 60 and 62 during the lateral movement and alignment of the axles 12 and 14 resulting from articulation of diagonal wheels of assembly 10. The common axis of pins 64 and 66 is located slightly farther from the center of assembly 10 than the axis of axle 12.

Each of the four connections between beams 18 and 20 and axles 12 and 14 in assembly 10 is of identical construction to that just described, the corresponding parts of these connections at each end of each axle 12 and 14 and at each end of each beam 18 and 20 being in alignment longitudinally and transversely of the assembly 10.

From the foregoing description of the embodiment of the invention illustrated in FIGURES 4 to 6, it is apparent that the tongue and groove connection between axle 12 and beam 18 formed by blocks 60 and 62 and notches 56 and 58 permits relative pivotal movement between axle 12 and beam 18 about the axis of pins 64 and 66 extending longitudinally of axle 12 and about an axis extending longitudinally of the beam 18, prevents relative movement between beam 18 and axle 12 in the direction of the longitudinal dimension of beam 18 and permits relative movement between axle 12 and beam 18 normal to their longitudinal dimensions as limited by the cooperative engagement between the bottom planar surface of plate 36 and the top spherical surface of block 38 and the cooperative engagement between the cylindrical surface 52 on the lower face of the housing of axle 12 and the raised portion 54 on beam 18. This arrangement assures free articulation of the axles as the wheels thereof pass over ground or road irregularities and in cooperation with but a single torque rod to each axle resists turning torques on the axles resulting from driving and braking.

FIGURES 7, 8 and 9 show a second embodiment of the present invention embodying leaf spring type rocker beams rather than the rigid rocker beams of the first embodiment. For the most part, the structure of this second embodiment is identical with that of the first embodiment. The corresponding identical parts are identified in the drawings with the same reference numerals in both embodiments, the numerals in the second embodiment being followed by a prime mark. With this identification, the following description will be limited to the distinguishing characteristics of the second embodiment to avoid repetition of description.

In the second enmbodiment, the rebound of the end of leaf spring 82 from the spherical topped supporting block 38' is limited by a pin 84 inserted in the lower half 44' of the bracket 46' transverse to the spring end. The end of the spring 82 which is inserted in the respective brackets 46' and rests on a hardened spherical faced block 38' comprises two spring leaves 86 and 88. While but a single leaf extending within bracket 46' would function properly mechanically, the provision of at least a pair of leaves is considered necessary as a safety feature. The sides of the ends of both leaves 86 and 88 are formed with notches 92, 94, 96 and 98 transversely as shown in FIGURE 7, the end of lower leaf 88 being provided with wider notches 94 and 98 on both sides than the notches 92 and 96 of upper leaf 86 as is illustrated in FIGURE 8. By this construction, the end of leaf 88 can move slightly in both directions, forwardly and rearwardly of the assembly, without binding on the blocks 60' and 62'.

The notches 92 and 94 coact with block 62' pivoted on pin 66' and notches 96 and 98 coact with block 60' pivoted on pin 64' to connect leaf spring beam 82 and axle 12' in a tongue and groove connection for relative pivotal movement about the pivot axes of blocks 60' and 62' and about an axis extending longitudinally of beam 82, the depth and spacing of the ends of notches 92, 94, 96 and 98 being such as to permit limited relative displacement between beam 82 and axle 12' in the direction of the pivot axis of blocks 60' and 62' in the same manner as in the first embodiment.

The pin 84 is so spaced from the spherical block 38' as to preclude disengagement of the notches of either leaf 86 or 88 from blocks 60' and 62'.

In articulating the tandem axle units of the present invention, the notches 56 and 58 on the ends of rigid beams 18 and 20 of the first embodiment and notches 92, 94, 96 and 98 on the ends of leaf springs 82 in the second embodiment move pivotally about the axis of the cross tube 22 as a common pivot center. The upper torque rods 30 and 32 cooperate with the beams 18 and 20 or 82 to confine the paths of movement of the axle to paths determined by torque rods 30 and 32 and the pivot axes of blocks 60 and 62 or 60' and 62' and to resist turning of axles 12 and 14 in response to driving and braking torques applied thereto. In the articulated positions of these axles, the pivoting blocks 60 and 62 or 60' and 62' take positions on their respective pins 64 and 66 or 64' and 66' throughout the entire travel of the axles in which the sides of the blocks 60 and 62 or 60' and 62' are in parallel relation to the sides of the notches on the beams 18 and 20 or 82 with which they are engaged. Limited lateral movement and alignment of the axles is permitted by the limited clearance between the ends of the notches and the end faces of the pivoting blocks, with a greater clearance at the side of the beam remote from the longitudinal center line of the tandem axle assembly to assure the necessary clearance when diagonal wheels are articulated.

This improved type of tandem axle suspension as disclosed in the foregoing description assures a superb riding quality even under severe road conditions by maintaining a highly effective stability throughout the entire unit under a minimum of wear of the moving parts. The wheels on both sides of the vehicle are free to adjust themselves individually to any obstruction in the road surface assuring a relative even frame level at all times accomplished by pivoting the center and both ends of the axle connecting suspension means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters patent is:

1. In a tandem axle assembly embodying spaced parallel axles interconnected at each end by rocker members extending substantially perpendicular to said axles, means connecting each said member to each said axle at their adjacent ends for relative pivotal movement about axes extending longitudinally of the member and of the axle by permitting limited relative sliding movement therebetween in the direction of such axle axis and preventing relative movement therebetween in the direction of such member axis wherein said connecting means comprises means defining transversely aligned grooves extending transversely of the opposite sides of said member adjacent the end thereof, a tongue slidably received in each such groove rotatably mounted on said axle, the pivot axes of said tongues being concentric and extending longitudinally of the axle, the spacing between the adjacent ends of said tongues being greater than the spacing between the bottoms of said grooves to permit limited relative movement between said member and axle longitudinally of the tongue pivot axis, and means establishing predetermined limits of relative movement between said axle and member normal to their longitudinal dimensions to prevent disengagement of said tongues from said grooves.

2. The tandem axle assembly defined in claim 1 wherein said limit establishing means includes a support on said axle beneath said member having a substantially spherical upper surface engaged by and rockably and slidably supporting said member.

3. In a tandem axle assembly embodying spaced parallel axles interconnected at each end by rocker members extending substantially perpendicular to said axles, means connecting each said member to each said axle at their adjacent ends for relative pivotal movement about axes extending longitudinally of the member and of the axle by permitting limited relative sliding movement therebetween in the direction of such axle axis and preventing relative movement therebetween in the direction of such beam axis, said connecting means comprising opposed tongue and groove connections at each side of the member interconnecting the member and axle, the tongues being rotatably mounted about a common axis extending longtiudinally of the axle and said tongue and groove connections being so constructed as to permit free limited sliding movement of the tongues relative to the grooves in the direction of their pivot axis, and means establishing predetermined limits of relative movement between said axle and member normal to their longitudinal dimensions.

4. A tandem axle assembly defined in claim 3 wherein said limit establishing means includes a support on said axle rockably and slidably supporting said beam relative to said axle.

5. In a tandem axle assembly for a vehicle, two spaced transverse axles supported at opposite ends by ground engaging wheels, suspension means comprising longitudinal members at opposite sides of the vehicle rockably mounted intermediate their ends, and means connecting the ends of the axles to the ends of said members for substantially universal relative movement comprising a rocking bottom connection between each end of each member and the associated axle and coacting vertically slidably displaceable trunnion side connections between each end of each member and the associated axle, said connections comprising cooperating engaged parts on each end of said member and the associated axle which prevent relative movement between said axles and the ends of said members in a direction longitudinally of said members while permitting vertical sliding movement at said connections, and the trunnions at each axle end being aligned with each other on axes substantially parallel to the axle.

6. In a vehicle suspension assembly for tandem axles, a longitudinally extending suspension member rockably mounted intermediate its ends and having flexible end connection with spaced axles, each end connection comprising axially aligned trunnion members slidably mounted in side notches adjacent the end of the member and pivotally connected to the axle and said notches being so disposed that said sliding movement is substantially perpendicular to the trunnion axis.

7. In the assembly defined in claim 6, each axle having a depending bracket loop rigid therewith and comprising side arms connected at their lower ends by a bridge, and said trunnion members each being pivoted in said opposite arm of the associated bracket.

8. In the assembly defined in claim 7, a rocking bottom connection for each member being provided on each said bridge.

9. In the assembly defined in claim 6, said trunnions comprising blocks slidable in said grooves, and one of said blocks being disposed deeper in its groove than the other.

10. In a tandem axle assembly of the type wherein suspension side members are rockably connected to the vehicle frame intermediate their ends and flexibly connected at both ends to the ends of transverse axles, each such flexible connection comprising axially aligned trunnions slidably mounted in notches on the ends of the member and pivotally connected to the associated axle, a free bottom bearing connection between the end of the member and associated axle, and means on said axle limiting movement of said member away from said bearing.

References Cited in the file of this patent
UNITED STATES PATENTS

| | | |
|---|---|---|
| 1,692,891 | Fageol | Nov. 27, 1928 |
| 1,946,060 | Buckendale | Feb. 6, 1934 |
| 2,237,575 | Quartullo | Apr. 8, 1941 |
| 2,437,158 | Heiney | Mar. 2, 1948 |
| 2,479,327 | Double | Aug. 16, 1949 |
| 2,550,331 | Crookston | Apr. 24, 1951 |
| 2,784,980 | Norrie | Mar. 12, 1957 |

FOREIGN PATENTS

| | | |
|---|---|---|
| 585,144 | Great Britain | Jan. 30, 1947 |